United States Patent
Noh et al.

(10) Patent No.: US 9,361,200 B2
(45) Date of Patent: Jun. 7, 2016

(54) ELECTRONIC APPARATUS INCLUDING USB TERMINALS AND CONTROL METHOD THEREOF BASED ON CURRENT OF USB DEVICES CONNECTED TO USB TERMINALS

(71) Applicant: SAMSUNG ELECTRONICS CO., LTD., Suwon-si (KR)

(72) Inventors: Young-joong Noh, Suwon-si (KR); Young-hun Choi, Hwaseong-si (KR); Jong-hee Han, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 5 days.

(21) Appl. No.: 14/317,005

(22) Filed: Jun. 27, 2014

(65) Prior Publication Data
US 2015/0006764 A1  Jan. 1, 2015

(30) Foreign Application Priority Data

Jun. 27, 2013 (KR) .................. 10-2013-0074840

(51) Int. Cl.
| | |
|---|---|
| G06F 3/00 | (2006.01) |
| G06F 13/12 | (2006.01) |
| G06F 11/30 | (2006.01) |
| G06F 13/40 | (2006.01) |

(52) U.S. Cl.
CPC ........ *G06F 11/3051* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 6,665,801 B1 | 12/2003 | Weiss | |
| 7,346,728 B1 | 3/2008 | Jackson | |
| 2002/0038432 A1* | 3/2002 | Hsu | 713/300 |
| 2007/0263250 A1* | 11/2007 | Koiwai | 358/1.15 |
| 2009/0059454 A1* | 3/2009 | Chu | 361/87 |
| 2012/0198119 A1* | 8/2012 | Johnson | 710/312 |
| 2012/0215468 A1* | 8/2012 | Geris et al. | 702/61 |

FOREIGN PATENT DOCUMENTS

| | | |
|---|---|---|
| EP | 1775652 A1 | 4/2007 |
| JP | 2012-185661 A | 9/2012 |
| KR | 10-2005-0004639 A | 1/2005 |
| KR | 10-2012-0112998 A | 10/2012 |
| WO | 2013/006753 A1 | 1/2013 |

OTHER PUBLICATIONS

Communication issued on Jul. 2, 2015 by European Patent Office in related Application No. 14173545.6.

* cited by examiner

*Primary Examiner* — David E Martinez
(74) *Attorney, Agent, or Firm* — Sughrue Mion, PLLC

(57) ABSTRACT

An electronic apparatus is provided. The electronic apparatus includes: a plurality of USB terminals, a sensor configured to sense a current of each of the connected USB devices and output current information in response to a USB device being connected to each of the plurality of USB terminals; a controller configured to determine whether or not a predetermined condition is satisfied based on the current information output from the sensor and permissible current information related to a current that is allowed to be supplied to the plurality of USB terminals, and output a message according to a result of the determination; and an outputter configured to output the message. Accordingly, a user may connect a USB device to a certain USB terminal without having to identify a current capacity, and thus user convenience is improved.

13 Claims, 7 Drawing Sheets

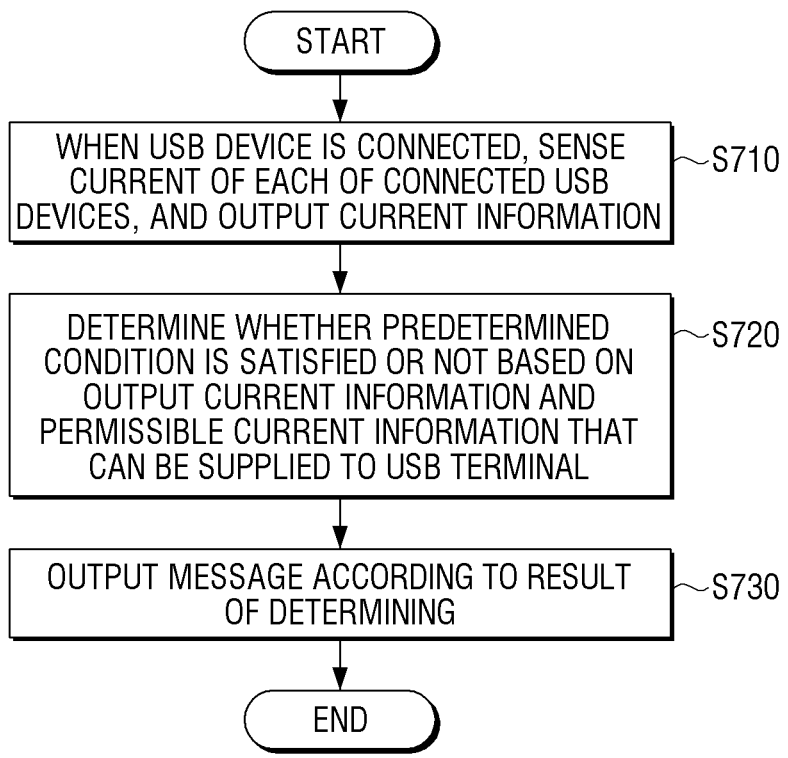

ELECTRONIC APPARATUS INCLUDING USB TERMINALS AND CONTROL METHOD THEREOF BASED ON CURRENT OF USB DEVICES CONNECTED TO USB TERMINALS

CROSS-REFERENCE TO RELATED APPLICATION

This application claims priority from Korean Patent Application No. 10-2013-0074840, filed on Jun. 27, 2013 in the Korean Intellectual Property Office, the disclosure of which is incorporated herein by reference, in its entirety.

BACKGROUND

1. Technical Field

Apparatuses and methods consistent with exemplary embodiments relate to an electronic apparatus and a control method thereof. More particularly, the exemplary embodiments relate to an electronic apparatus which has a plurality of universal serial bus (USB) devices connected to a plurality of USB terminals, and a control method thereof.

2. Description of the Related Art

Electronic apparatuses may be connected with a variety of external apparatuses. One widespread method is to connect electronic apparatuses according to the USB standard. The electronic apparatuses include a plurality of USB terminals to be connected with a variety of external apparatuses.

In the case of the electronic apparatus that supports the USB connection method and includes a plurality of USB input terminals, each terminal has an overcurrent protection circuit embedded therein, according to a load current of the apparatus connected according to the USB connection method. A current capacity permissible in the overcurrent protecting circuit is generally divided into a high capacity (for example, 1.5 A) and a low capacity (for example, 0.5 A). Accordingly, the USB input terminal is divided into a USB terminal to be connected with a high-capacity USB device as well as connected with a low-capacity USB device, and an input terminal to be connected only with the low-capacity USB device.

Manufacturers may mark a printed specification relating to current capacity on the electronic apparatuses, in order for users to recognize a difference in current capacity. However, it may be difficult for users to recognize the specification of a current capacity according to a print location, and the user may be inconvenienced in having to identify the capacity of the USB device that the user wishes to connect.

Therefore, there is a need for a method for connecting a USB device to an electronic apparatus without having to identify the capacity of the USB device.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an electronic apparatus which can connect a USB device to a certain USB terminal regardless of a current capacity of the USB device, and a control method thereof.

According to an aspect of an exemplary embodiment, there is provided an electronic apparatus including: a plurality of USB terminals; a sensor configured to sense a current of each of the connected USB devices and output current information in response to a USB device being connected to each of the plurality of USB terminals; a controller configured to determine whether or not a predetermined condition is satisfied, based on the current information output from the sensor and permissible current information related to a current that is allowed to be supplied to the plurality of USB terminals, and output a message according to a result of the determination; and an outputter configured to output the message.

The current information may be identification information to identify whether the connected USB device is a low current device or a high current device.

The identification information may be at least one of a first flag value to identify a low current device, and a second flag value to identify a high current device.

The controller may calculate present use current information based on a number of USB devices connected to the plurality of USB terminals, and the identification information, and may determine whether or not the predetermined condition is satisfied or not based on the calculated present use current information and the permissible current information.

The current information may be a current value configured to be sensed by each of the connected USB devices, and the controller may be configured to add up the sensed current values, and may determine whether or not the predetermined condition is satisfied, based on the added sensed current values and the permissible current information.

The predetermined condition may be at least one of a first condition in which remaining current information, which is calculated based on the current information output from the sensor, and the permissible current information on the current that is allowed to be supplied to the plurality of USB terminals, is less than a predetermined current value, and a second condition in which the current information output from the sensor exceeds the permissible current information.

In response to the first condition being satisfied, the controller may perform a control operation to output a guide message which guides a currently connectible device based on the remaining current information.

According to an aspect of another exemplary embodiment, there is provided a method of controlling an electronic apparatus including a plurality of USB terminals, the method including: sensing a current of each of the connected USB devices and outputting current information in response to a USB device being connected to each of the plurality of USB terminals; determining whether or not a predetermined condition is satisfied, based on the output current information and permissible current information related to a current that is allowed to be supplied to the plurality of USB terminals; and outputting a message according to a result of the determination.

The current information may be identification information to identify whether the connected USB device is a low current device or is a high current device.

The identification information may be at least one of a first flag value to identify the low current device, and a second flag value to identify the high current device.

The determining whether or not the predetermined condition is satisfied may include calculating present use current information, based on a number of USB devices connected to the plurality of USB terminals, and the identification information, and determining whether or not the predetermined condition is satisfied, based on the calculated present use current information and the permissible current information.

The current information may be a current value that is sensed by each of the connected USB devices, and the determining whether or not the predetermined condition is satisfied may include adding up the sensed current values, and determining whether or not the predetermined condition is satisfied based on the added current value and the permissible current information.

The predetermined condition may be at least one of a first condition in which remaining current information, which is calculated based on the output current information, and the permissible current information on the current that is allowed to be supplied to the plurality of USB terminals, is less than a predetermined current value, and a second condition in which the output current information exceeds the permissible current information.

An aspect of an exemplary embodiment may provide an electronic apparatus for identifying the current capacity of USB devices connected to the electronic apparatus and comparing a current capacity of the connected USB devices to a current capacity of the electronic apparatus, the electronic apparatus including: a plurality of USB terminals; a sensor configured to sense a current of each connected USB device and output current information in response to at least one USB device being connected to at least one of the plurality of USB terminals; and a controller configured to determine whether or not a predetermined condition is satisfied based on the current information output from the sensor and permissible current information related to a current that is allowed to be supplied to the plurality of USB terminals, and output a message according to a result of the determination.

The controller is configured to output the message to an outputter, which outputs the message to a user of the apparatus.

The current information may be identification information to identify whether the connected USB device is a low current device or a high current device.

The identification information may be at least one of a first flag value to identify the low current device, and a second flag value to identify the high current device.

In addition, the controller may be configured to calculate current information related to present use based on a number of USB devices connected to the plurality of USB terminals, calculated the identification information, and determine whether or not the predetermined condition is satisfied, based on the calculated current information related to present use and the permissible current information.

The outputting the message may include outputting a guide message guiding on a currently connectible device based on the remaining current information, in response to the first condition being satisfied.

According to the above-described exemplary embodiments, the user can connect a USB device to a certain USB terminal without identifying a current capacity of the USB device, and thus, user convenience is improved.

BRIEF DESCRIPTION OF THE DRAWING FIGURES

The above and/or other aspects will be more apparent by describing in detail exemplary embodiments, with reference to the accompanying drawings, in which:

FIG. 7 is a flowchart which illustrates a method of controlling an electronic apparatus, according to an exemplary embodiment.

DETAILED DESCRIPTION OF THE EXEMPLARY EMBODIMENTS

Figure 1:
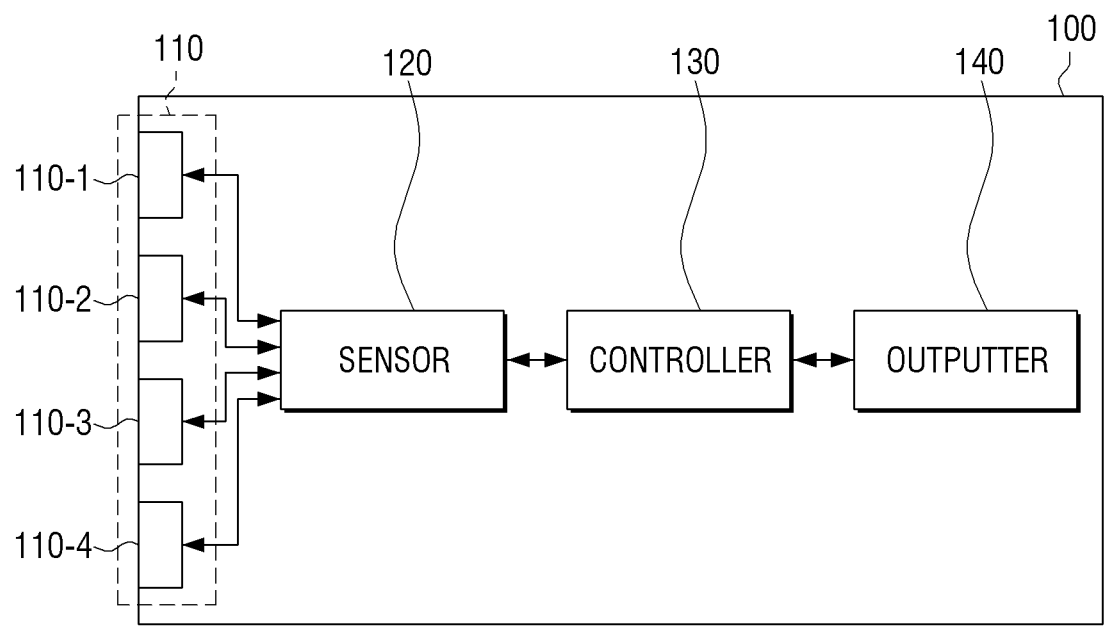
FIG. 1 is a block diagram which illustrates a configuration of an electronic apparatus, according to an exemplary embodiment.

Hereinafter, exemplary embodiments will be described in greater detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram which illustrates a configuration of an electronic apparatus, according to an exemplary embodiment.

Referring to FIG. 1, an electronic apparatus 100 includes a plurality of USB terminals 110, a sensor 120, a controller 130, and an outputter 140. For example, the electronic apparatus 100 may be implemented by using an tablet personal computer (PC), a notebook computer, a laptop computer, a portable multimedia player (PMP), a personal digital assistant (PDA), a smartphone, a digital album, a digital TV and a monitor.

The plurality of USB terminals 110 may connect the electronic apparatus 100 to a USB device (not shown) according to the USB connection standards, and may include at least two USB terminals. In FIG. 1, the electronic apparatus 100, including a total of four USB terminals 110-1, 110-2, 110-3, and 110-4, is illustrated.

In response to a USB device being connected to each of the plurality of USB terminals 110, the sensor 120 senses an electric current (hereinafter, referred to as a "current") of each of the connected USB devices. For example, in response to a USB device being connected to the first USB terminal 110-1, the electronic apparatus 100 supplies a current to the connected USB device. The sensor 120 senses the current which is supplied to the USB device through the first USB terminal 110-1. That is, in response to the USB device being connected to each terminal, the sensor 120 separately senses a current supplied through the first USB terminal 110-1, a current supplied through the second USB terminal 110-2, a current supplied through the third USB terminal 110-3, and a current supplied through the fourth USB terminal 110-4. Although the sensor 20 is illustrated as one element in FIG. 1, a sensor 120 may be separately provided for each USB terminal.

The electronic apparatus, which includes the USB terminals, includes a current restrictor (not shown) in each USB terminal to prevent an overcurrent. The current restrictor of each USB terminal may set a current capacity to be able to connect to a high current device. The sensor 120 and the current restrictor may be implemented as a single element.

The sensor 120 senses the current and outputs current information. The current information may be identification information to identify whether the USB device connected to each USB terminal is a low current device or a high current device. Also, the current information may be a current value that is sensed by each of the connected USB devices. A detailed process of the electronic apparatus 100 will be explained.

The controller 130 determines whether or not a predetermined condition is satisfied based on the current information which is output from the sensor 120, and permissible current information related to a current that is allowed to be supplied to the plurality of USB terminals. For example, the predetermined condition may be a condition in which remaining current information related to a remaining current that can be supplied to the USB terminals is less than a predetermined current value. The predetermined condition may be a condition in which current information supplied to the USB terminal exceeds the permissible current information. The current information supplied to the USB terminal is the same as the current information output from the sensor 120.

The controller 130 may calculate the remaining current information using the current information output from the sensor 120 and total current information related to a total current that can be supplied to the USB terminals. The total current information may refer to the permissible current information. When the calculated remaining current information is less than a predetermined value, the controller 130 may determine that the predetermined condition is satisfied. In response to the current information output from the sensor 120 exceeding the total current information that can be supplied to the USB terminals, the controller 130 may determine that the predetermined condition is satisfied. In response to a determination that the predetermined condition is satisfied, the controller 130 controls outputter 140 to output a message which corresponds to a result of the determination.

The outputter 140 outputs the message under the control of the controller 130. For example, the outputter 140 may be a display that outputs an image or may be a speaker that outputs a sound. When the outputter 140 is the display, the electronic apparatus 100 may display the message on the display. When the outputter 140 is the speaker, the electronic apparatus 100 may output the message as a voice.

In FIG. 1, the function of each element has been described with reference to the block diagram of the electronic apparatus 100. Hereinafter, an operation of the electronic apparatus 100 will be explained according to an exemplary embodiment.

Figure 2:
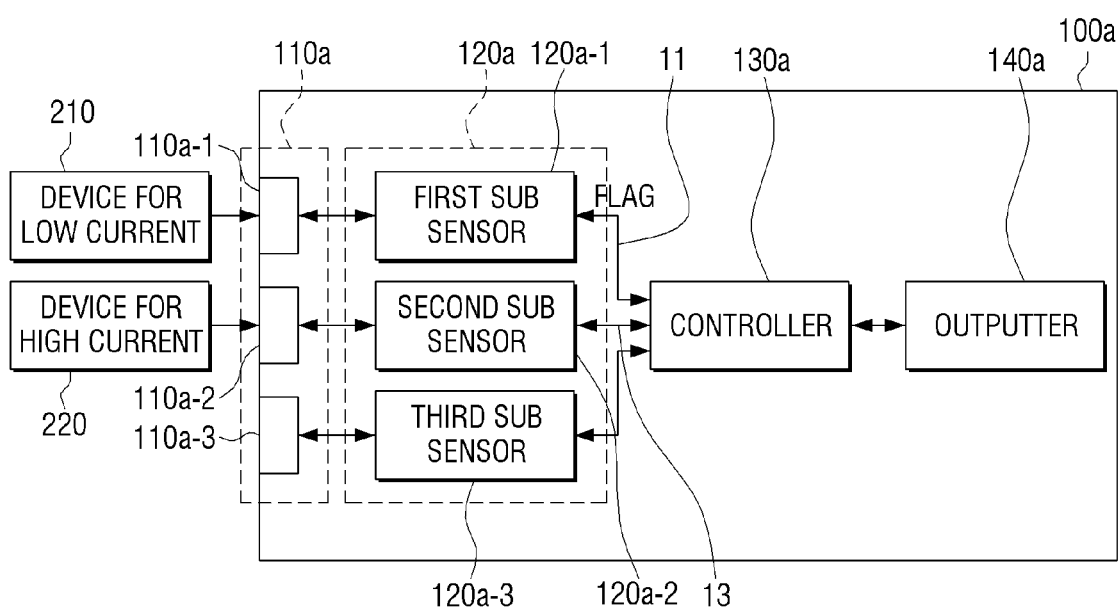
FIG. 2 is a view which illustrates an operation of an electronic apparatus, according to a first exemplary embodiment.

FIG. 2 is a view which illustrates an operation of an electronic apparatus according, to a first exemplary embodiment.

Referring to FIG. 2, an electronic apparatus 100a includes a plurality of USB terminals 110a, a sensor 120a, a controller 130a, and an outputter 140a. The plurality of USB terminals 110a of FIG. 2 include three USB terminals 110a-1, 110a-2, and 110a-3. The sensor 120a may respectively include, in one sensor, a first sub-sensor 120a-1, a second sub-sensor 120a-2, and a third sub-sensor 120a-3 which corresponds to the USB terminals. The first to third sub-sensors 120a-1, 120a-2, and 120a-3 may alternatively be implemented by using separate sensors. As explained in FIG. 1, the first to third sub sensors 120a-1, 120a-2, and 120a-3 may be implemented in the current restrictor (not shown). Each current restrictor which corresponds to each of the USB terminals 110a-1, 110a-2, and 110a-3 may set a high capacity current value as a restricting current value in order to control the supply of current to a high current device.

As shown in FIG. 2, a low current device 210 is connected to the first USB terminal 110a-1. For example, the low current device 210 refers to a device that requires a relatively small current, like a USB memory. For example, the low current device 210 may require a current that is less than or equal to 0.5 A. When the low current device 210 is connected, the electronic apparatus 100a supplies the current of 0.5 A to the low current device 210. The first sub sensor 120a-1 connected to the first USB terminal 110a-1 senses the current supplied to the low current device 210 and recognizes that the connected device is the low current device.

The first sub sensor 120a-1 may output current information. The current information may be identification information to identify whether a connected USB device is a low current device or a high current device. For example, the identification information may be a first flag value to identify the low current device. That is, when the first to third sub sensors 120a-1, 120a-2, and 120a-3 recognize that devices connected to the corresponding USB terminals 110a-1, 110a-2, and 110a-3 are low current devices, the first to third sub sensors 120a-1, 120a-2, and 120a-3 may output 1 as flag values. When the first to third sub sensors 120a-1, 120a-2, and 120a-3 recognize that high current devices are connected, they may not output any information. The controller 130a may accumulate the output flag values and recognize how many low current devices are connected based on the accumulated flag value. That is, when the accumulated flag value is 1, the controller 130 may recognize that one low current device is connected, and when the accumulated flag value is 2, the controller 130 may recognize that two low current devices are connected.

Also, the identification information may be a second flag value to identify the high current device. For example, the high current device 220 refers to a device that requires relatively large amount of current like a USB storage apparatus. For example, the high current device 210 may require a current which is greater than or equal to 0.5 A and less than or equal to 1.5 A.

When the first to third sub sensors 120a-1, 120a-2, and 120a-3 recognize that devices connected to the corresponding USB terminals 110a-1, 110a-2, and 110a-3 are high current devices, the first to third sub sensors 120a-1, 120a-2, and 120a-3 may output 1 as flag values. When the first to third sub sensors 120a-1, 120a-2, and 120a-3 recognize that low current devices are connected, the first to third sub sensors 120a-1, 120a-2, and 120a-3 may not output any information. The controller 130a may accumulate the output flag values and may recognize how many high current devices are connected based on the accumulated flag value. That is, when the accumulated flag value is 1, the controller 130 may recognize that one high current device is connected, and, when the accumulate flag value is 2, the controller 130 may recognize that two high current devices are connected.

The electronic apparatus 100a illustrated in FIG. 2 is set to output a flag value when the low current device is connected. Since the low current device is connected to the first USB terminal 110a-1, the first sub sensor 120a-1 outputs 1 as the flag value (11).

The high current device 220 may be connected to the second USB terminal 110a-2. The second sub sensor 120a-2 may recognize that the high current device is connected in the same way as described above. Since the second sub sensor 120a-2 recognizes that the high current device is connected to the second USB terminal 110a-2, the second sub-sensor 120a-2 may not output the flag value (13). The controller 130a determines whether or not a predetermined condition is satisfied by comparing the supplied current and the total current that can be supplied to the USB terminals, based on the number of connected devices and the accumulated flag value. The number of connected devices may be recognized using information that is input to a pin according to the USB connection standards.

For example, it is assumed that the total current that can be supplied to the USB terminals is 2.5 A, and 0.5 A is set for the low current device and 1.5 A is set for the high current device. Referring to FIG. 2, since two devices are connected and the flag value is 1, the controller 130*a* may recognize that one low current device (0.5 A) is connected and one high current device (1.5 A) is connected. Accordingly, the controller 130*a* recognizes that the total current supplied to the connected devices is 2.0 A and calculates a remaining current of 0.5 A by comparing the recognized total current and the total current that can be supplied to the USB terminals. The controller 130*a* determines that it is impossible to supply the remaining current to any additional high current device, and outputs a message.

In the above-described example, three cases are possible according to the connected devices as follows:

1) number of connected devices: 2, flag value: 2
2) number of connected devices: 2, flag value: 1
3) number of connected devices: 2, flag value: 0

In the case of 1), the flag value is 2. Therefore, the controller 130*a* may recognize that two low current devices (0.5 A) are connected. Accordingly, the controller 130*a* recognizes that the total current supplied to the connected devices is 1 A and calculates a remaining current of 1.5 A, by comparing the supplied total current and the total current of 2.5 A that can be supplied to the USB terminals. The controller 130*a* determines that it is possible to supply the remaining current to any additional high current device, and may not output any message.

The case of 2) corresponds to the case illustrated in FIG. 2.

In the case of 3), the flag value is 0. Therefore, the controller 130*a* may recognize that two high current devices (1.5 A) are connected. Accordingly, the controller 130*a* may recognize that the total current supplied to the connected devices is 3 A, which exceeds the total current of 2.5 A that can be supplied to the USB terminals. Accordingly, since the predetermined condition is satisfied, the controller 130*a* outputs a corresponding message.

Figure 3:
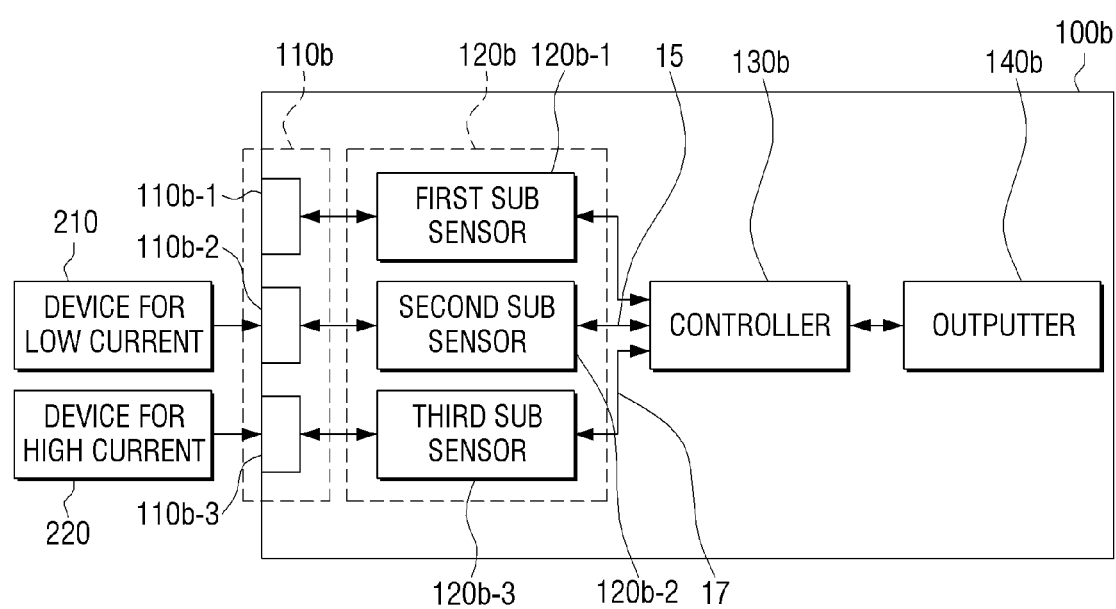
FIG. 3 is a view which illustrates an operation of an electronic apparatus, according to a second exemplary embodiment.

FIG. 3 is a view which illustrates an operation of an electronic apparatus, according to a second exemplary embodiment.

Referring to FIG. 3, an electronic apparatus 100*b* includes a plurality of USB terminals 110*b*, a sensor 120*b*, a controller 130*b*, and an outputter 140*b*. A low current device 210 (for example, 0.5 A) is connected to the second USB terminal 110*b*-2. The second sub sensor 120*b*-2 senses a current supplied to the low current device 210 and outputs current information. The current information recited herein may refer to a current value that is supplied to the USB device, that is, a current value that is sensed by the USB device.

With the assumption that a permissible current that is allowed to be supplied to all of the USB terminals is 2.5 A, the controller 130*b* recognizes that a consumed current is 0.5 A based on the sensed current value. Accordingly, since a remaining current is 2 A and it is possible to supply the remaining current to any additional high current device (for example, 1.5 A), the controller 130*b* does not output any message.

In this state, a high current device 220 (for example, 1.5 A) is connected to the third USB terminals 110*b*-3. As described above, a current restrictor (not shown) connected to each of the USB terminals 110*b*-1, 110-*b*2, and 110*b*-3 may set a restricting current value to be able to be connected to the high current device. Accordingly, the high current device may be connected regardless of the USB terminal.

The third sub sensor 120*b*-3 senses the current supplied to the high current device 220 and outputs current information.

For example, the third sub sensor 120*b*-3 may output 1.5 A. The controller 130*b* receives the current value (1.5 A) output from the third sub sensor 120*b*-3, and adds the current value (1.5 A) to the current value (0.5 A) output from the second sub sensor 120*b*-2. In this case, since the added current value is 2 A and the permissible current that can be supplied is 2.5 A, the remaining current is 0.5 A. The remaining current is not sufficient to be supplied to an additional high current device. Accordingly, the controller 130*b* determines that the condition in which the calculated remaining current information is less than a predetermined current value is satisfied, and thus outputs a message.

When an additional high current device (not shown) (1.5 A) is connected to the first USB terminal 110*b*-1, the controller 130*b* calculates the added current value of 3.5 A through the above-described process. The controller 130*b* determines that the condition in which the added current value (3.5 A) exceeds the permissible current value (2.5 A) is satisfied, and thus outputs a message.

In the above-described examples, the detailed current values are merely examples and various values may be set as a current value for the low current device and a current value for the high current device.

Figure 4:
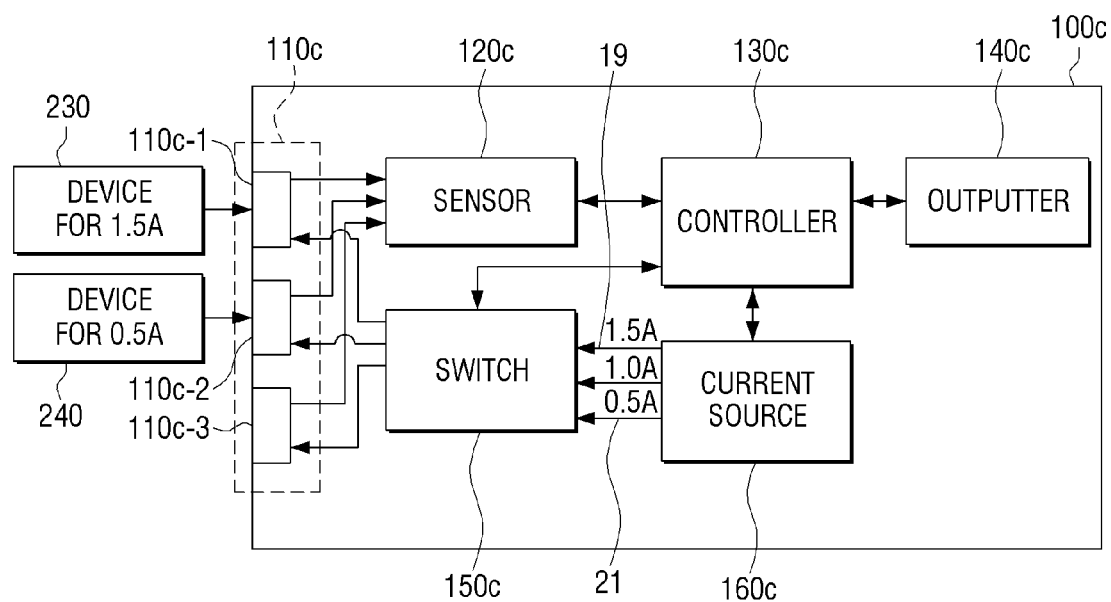
FIG. 4 is a view which illustrates an operation of an electronic apparatus, according to a third exemplary embodiment.

FIG. 4 is a view which illustrates an operation of an electronic apparatus according to a third exemplary embodiment.

Referring to FIG. 4, an electronic apparatus 100*c* includes a plurality of USB terminals 110*c*, a sensor 120*c*, a controller 130*c*, an outputter 140*c*, a switch 150*c*, and a current source 160*c*. The plurality of USB terminals 110*c* may include a first USB terminal 110*c*-1, a second USB terminal 110*c*-2 and a third USB terminal 110*c*-3. The number of USB terminals may be implemented in various ways. Although the sensor 120*c* is illustrated as a single element in FIG. 4, a sensor 120*c* may separately sense a current that is supplied to a device connected each of the USB terminals.

A 1.5 A device 230 is connected to the first USB terminal 110*c*-1. When the 1.5 A device 230 is initially connected, the electronic apparatus 100*c* supplies a current to the 1.5 A device 230 through the current source 160*c* or a separate current source (not shown). The sensor 120*c* senses a current value required by the connected device using the supplied current. Since the 1.5 A device 230 is connected in FIG. 4, the sensor 120*c* senses the current of 1.5 A and outputs current information. The controller 130*c* controls the switch 150*c* to form an appropriate current path using the current information output from the sensor 120*c*. The switch 150*c* switches to connect a 1.5 A current line 19 which is output from the current source 160*c* and the first USB terminal 110*c*-1 under the control of the controller 130*c*.

In this state, a 0.5 A device 240 is connected to the second USB terminal 110*c*-2. In the same way as described above, the electronic apparatus 100*c* supplies a current to the 0.5 A device 240 through the current source 160*c* or through a separate current source (not shown). The sensor 120*c* senses a current value required by the connected device using the supplied current. Since the 0.5 A device 240 is connected in FIG. 4, the sensor 120*c* senses the current of 0.5 A and outputs current information. The controller 130*c* controls the switch 150*c* to form an appropriate current path using the current information output from the sensor 120*c*. The switch 150*c* switches a 0.5 A current line 21 which is output from the current source 160*c* and the second USB terminal 110*c*-2 under the control of the controller 130*c*.

On the other hand, the sensor 120*c* may output a count value based on a consumed current of the connected device. The controller 130 may determine the number of connected devices and a current that is consumed in the connected device using the count value. For example, the count value may be set to 1 when a 0.5 A device is connected, set to 2 when a 1.0 A device is connected, and set to 3 when a 1.5 A device is connected.

When an additional USB device is connected to the remaining USB terminal and it is impossible to form an appropriate current path for the connected USB device, the controller 130c determines that a predetermined condition is satisfied and outputs a corresponding message.

As described above, when the predetermined condition is satisfied, the electronic apparatus may output a corresponding message for the user. Hereinafter, a method for outputting a message of the electronic apparatus will be explained.

Figure 5:
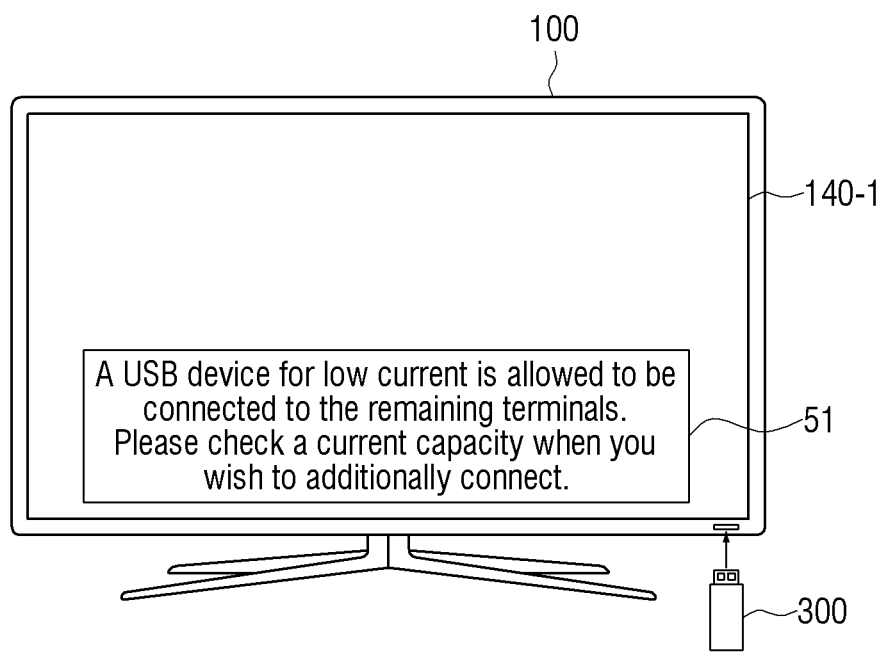
FIGS. 5 and 6 are views to illustrate message output of an electronic apparatus according, to an exemplary embodiment.

FIG. 5 is a view which illustrates a method for outputting a message of an electronic apparatus, according to an exemplary embodiment.

Referring to FIG. 5, an electronic apparatus 100 is illustrated. The electronic apparatus 100 includes a display 140-1. The display 140-1 is an example of the outputter 140.

The controller 130 determines whether or not the predetermined condition is satisfied, through the above-described process. The predetermined condition may be at least one of a first condition in which remaining current information, which is calculated based on current information output from the sensor 120, and permissible current information which can be supplied to the plurality of USB terminals, is less than a predetermined current value, and a second condition in which current information output from the sensor 120 exceeds the permissible current information. FIG. 5, mainly explains the first condition.

When a USB device 300 is connected to the electronic apparatus 100, the controller 130 may calculate the remaining current information. The controller 130 determines whether or not the remaining current information is less than a predetermined current value. For example, the predetermined current value may be set to a current value (for example, a value less than 1.5 A) that cannot be supplied to a high current device. In response to a determination that the remaining current information is less than the predetermined current value, the controller 130 may output a message to guide a currently connectable device, based on the remaining current information.

As shown in FIG. 5, the electronic apparatus 100 may output a message on display 140-1 saying "A low current USB device is allowed to be connected to the remaining terminals. Please check the current capacity when you wish to additionally connect." The above message is merely an example and an appropriate message may be output.

Similarly, in response to a determination that the current information output from the sensor 120 exceeds the permissible current information, the controller 130 may control to output a corresponding message on the display 140-1.

Figure 6:
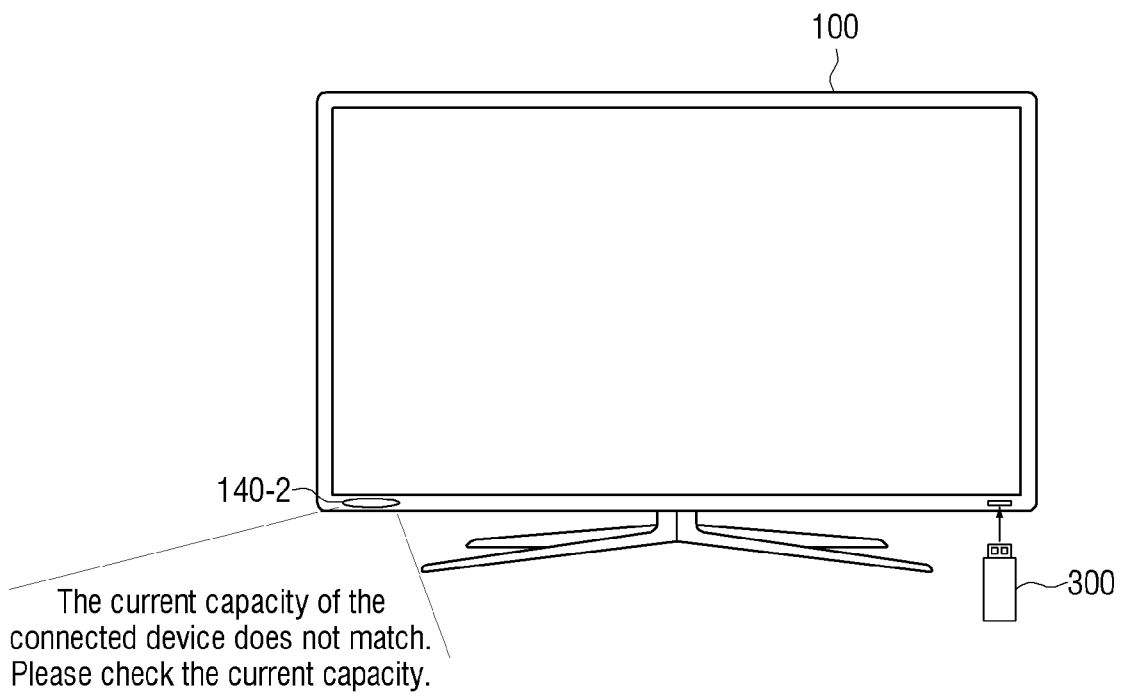

FIG. 6 is a view which illustrates a method of outputting a message of an electronic apparatus, according to another exemplary embodiment.

Referring to FIG. 6, the electronic apparatus 100 includes a speaker 140-2. The speaker 140-2 is an example of the outputter 140. The controller 130 determines whether or not a predetermined condition is satisfied. The predetermined condition is the same as described above with reference to FIG. 5. FIG. 6 mainly describes the second condition. In response to the USB device 300 being connected to the electronic apparatus 100, the controller 130 may calculate a current that is supplied to all of the connected USB devices. In response to a determination that the calculated supply current exceeds a permissible current, the controller 130 may output a corresponding message.

As shown in FIG. 6, the electronic apparatus 100 may output a message through the speaker 140-2 saying "The current capacity of the connected device does not match. Please check the current capacity."

Similarly, in response to a determination that the calculated remaining current information is less than a predetermined current value, the controller 130 may perform a control operation to output a corresponding message through the speaker 140-2.

Up to now, a process has been described of sensing a current required by the device connected to the electronic apparatus 100 and outputting a corresponding message in response to a determination that the predetermined condition is satisfied. Hereinafter, a control method of an electronic apparatus will be explained.

FIG. 7 is a flowchart which illustrates a method of controlling an electronic apparatus, according to an exemplary embodiment.

Referring to FIG. 7, when a USB device is connected to each of the plurality of USB terminals, the electronic apparatus senses a current supplied to each of the connected USB devices and outputs current information (S710). The current information may be identification information to identify whether the USB device is a low current device or a high current device. The identification information may be a flag value that is set to be output when the low current device is connected, or may be a flag value that is set to be output when the high current device is connected. Also, the current information may be a current value that is sensed in each of the connected USB devices.

The electronic apparatus may determine whether or not a predetermined condition is satisfied based on the output current information and permissible current information which indicates a current that is allowed to be supplied to the plurality of USB terminals (S720). The predetermined condition may be at least one of a condition in which remaining current information which is calculated based on the current information output from the sensor 120 and the permissible current information that is allowed to be supplied to the plurality of USB terminals is less than a predetermined current value, and a condition in which the current information output from the sensor 120 exceeds the permissible current information.

The electronic apparatus outputs a message according to a result of the determination (S730). The message may be output on the screen or may be output as a voice through the speaker.

The method of controlling the electronic apparatus according to the exemplary embodiments described above may be implemented as a program and provided to the electronic apparatus.

For example, a non-transitory computer readable medium, which stores a program for: sensing a current of each of the connected USB devices and outputting current information when a USB device is connected to each of the plurality of USB terminals, determining whether or not a predetermined condition is satisfied based on the output current information and permissible current information, on a current that can be supplied to the plurality of USB terminals, and outputting a message according to a result of the determination, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray Disc™, a universal serial bus (USB), a memory card, and a read only memory (ROM), and may be provided.

The foregoing exemplary embodiments and advantages are merely exemplary and are not to be construed as limiting the disclosure. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus comprising:
    a plurality of USB terminals;
    a sensor configured to sense a current of each of connected USB devices and output current information in response to a USB device being connected to each of the plurality of USB terminals;
    a controller configured to determine whether or not a predetermined condition is satisfied based on the current information output from the sensor and permissible current information related to a current that is allowed to be supplied to the plurality of USB terminals, and output a message according to a result of the determination; and
    an outputter configured to output the message,
    wherein the current information is identification information to identify whether the connected USB device is a low current device or a high current device, and
    wherein the controller is configured to calculate current information related to present use based on a number of USB devices connected to the plurality of USB terminals, calculated the identification information, and determine whether or not the predetermined condition is satisfied, based on the calculated current information related to present use and the permissible current information.

2. The electronic apparatus as claimed in claim 1, wherein the identification information is at least one of a first flag value to identify the low current device, and a second flag value to identify the high current device.

3. The electronic apparatus as claimed in claim 1, wherein the current information is a current value that is sensed by each of the connected USB devices,
    wherein the controller adds up the sensed current values, and determines whether or not the predetermined condition is satisfied, based on the added current values and the permissible current information.

4. The electronic apparatus as claimed in claim 1, wherein the predetermined condition is at least one of a first condition in which remaining current information, which is calculated based on the current information output from the sensor, and the permissible current information related to the current that is allowed to be supplied to the plurality of USB terminals is less than a predetermined current value, and a second condition in which the current information output from the sensor exceeds the permissible current information.

5. The electronic apparatus as claimed in claim 4, wherein the controller is configured to perform a control operation to output a guide message with respect to a currently connectible device based on the remaining current information when the first condition is satisfied.

6. A method for controlling of an electronic apparatus comprising a plurality of USB terminals, the method comprising:

sensing a current of each of the connected USB devices and outputting current information in response to a USB device being connected to each of the plurality of USB terminals;
    determining whether or not a predetermined condition is satisfied, based on the output current information and permissible current information related to a current that is allowed to be supplied to the plurality of USB terminals; and
    outputting a message according to a result of the determination,
    wherein the current information is identification information to identify whether the connected USB device is a low current device or a high current device, and
    wherein the determining whether or not the predetermined condition is satisfied comprises calculating current information related to a present use, current information based on a number of USB devices connected to the plurality of USB terminals, and the identification information, and determining whether or not the predetermined condition is satisfied or not based on the calculated current information related to the current information related to the present use, and the permissible current information.

7. The method as claimed in claim 6, wherein the identification information is at least one of a first flag value to identify the low current device, and a second flag value to identify the high current device.

8. The method as claimed in claim 6, wherein the current information is a current value that is sensed by each of the connected USB devices,
    wherein determining whether or not the predetermined condition is satisfied comprise adding up the sensed current values, and determining whether or not the predetermined condition is satisfied based on the added current value and the permissible current information.

9. The method as claimed in claim 6, wherein the predetermined condition is at least one of a first condition in which remaining current information, which is calculated based on the output current information, and the permissible current information on the current that is allowed to be supplied to the plurality of USB terminals, is less than a predetermined current value, and a second condition in which the output current information exceeds the permissible current information.

10. The method as claimed in claim 9, wherein outputting the message comprises, outputting a guide message guiding on a currently connectible device based on the remaining current information in response to the first condition being satisfied.

11. An electronic apparatus for identifying the current capacity of USB devices connected to the electronic apparatus and comparing a current capacity of the connected USB devices to a current capacity of the electronic apparatus, the electronic apparatus comprising:
    a plurality of USB terminals;
    a sensor configured to sense a current of each connected USB device and output current information in response to at least one USB device being connected to at least one of the plurality of USB terminals;
    a controller configured to determine whether or not a predetermined condition is satisfied based on the current information output from the sensor and permissible current information related to a current that is allowed to be supplied to the plurality of USB terminals, and output a message according to a result of the determination, wherein the current information is identification information to identify whether the connected USB device is a low current device or a high current device, and wherein the controller is configured to calculate current information related to present use based on a number of USB devices connected to the plurality of USB terminals, calculated the identification information, and determine whether or not the predetermined condition is satisfied, based on the calculated current information related to present use and the permissible current information.

12. The electronic apparatus of claim 11, wherein the controller is configured to output the message to an outputter, which outputs the message to a user of the apparatus.

13. The electronic apparatus as claimed in claim 11, wherein the identification information is at least one of a first flag value to identify the low current device, and a second flag value to identify the high current device.

* * * * *